May 30, 1967  C. KELLER ETAL  3,322,237
PARKING BRAKE MECHANISM
Filed Sept. 10, 1965  2 Sheets-Sheet 1
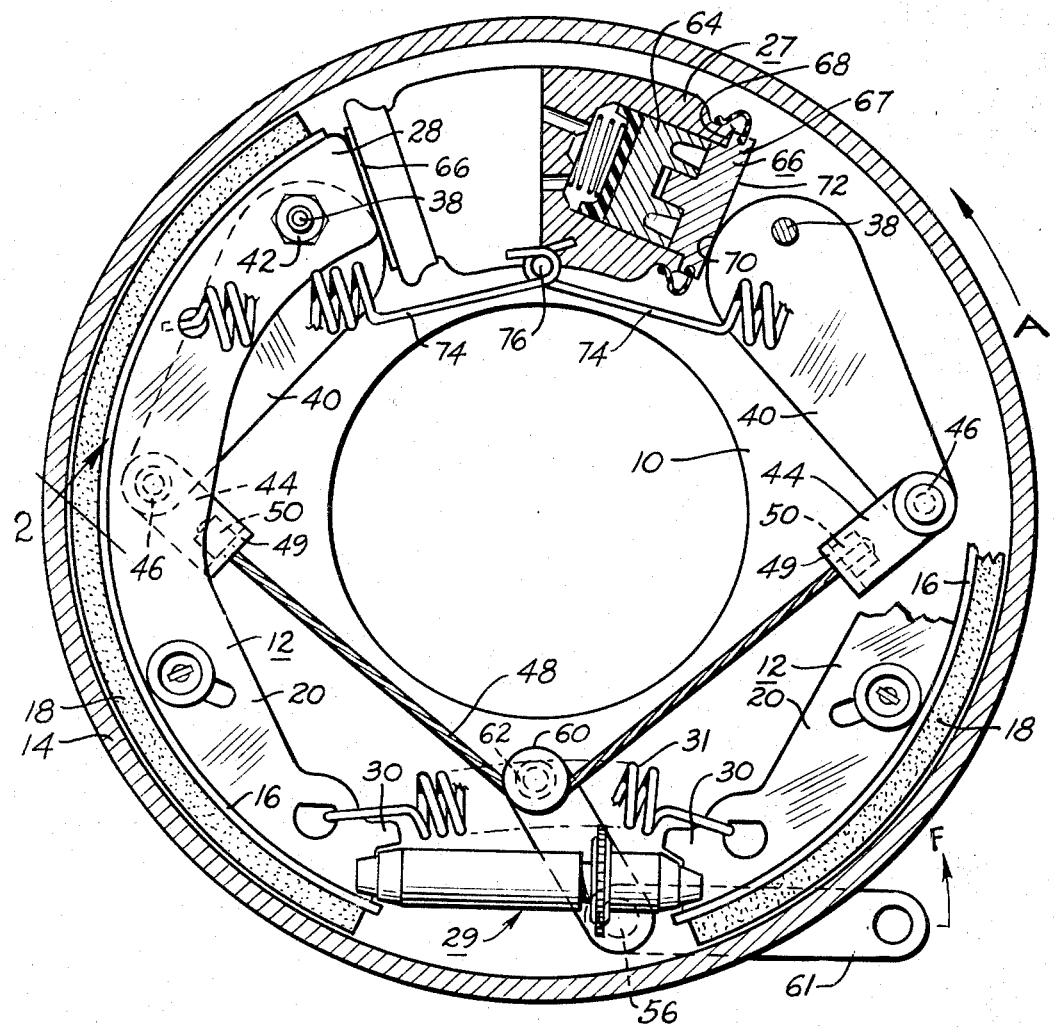
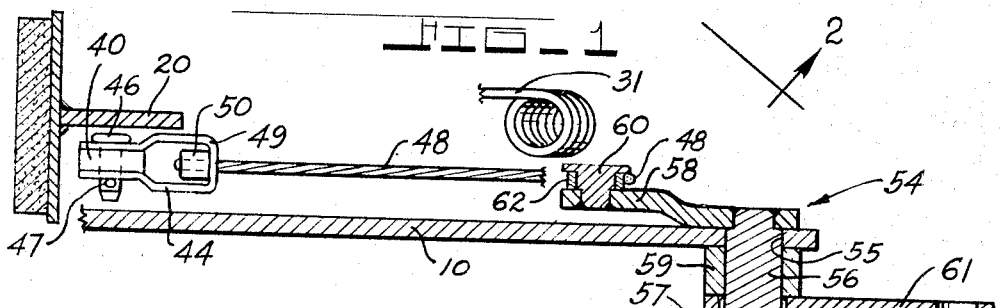
INVENTORS.
CLARENCE KELLER.
BURTON M. TINCHER.
ROBERT A. WAGNER.
BY Sheldon F. Raizes
ATTORNEY

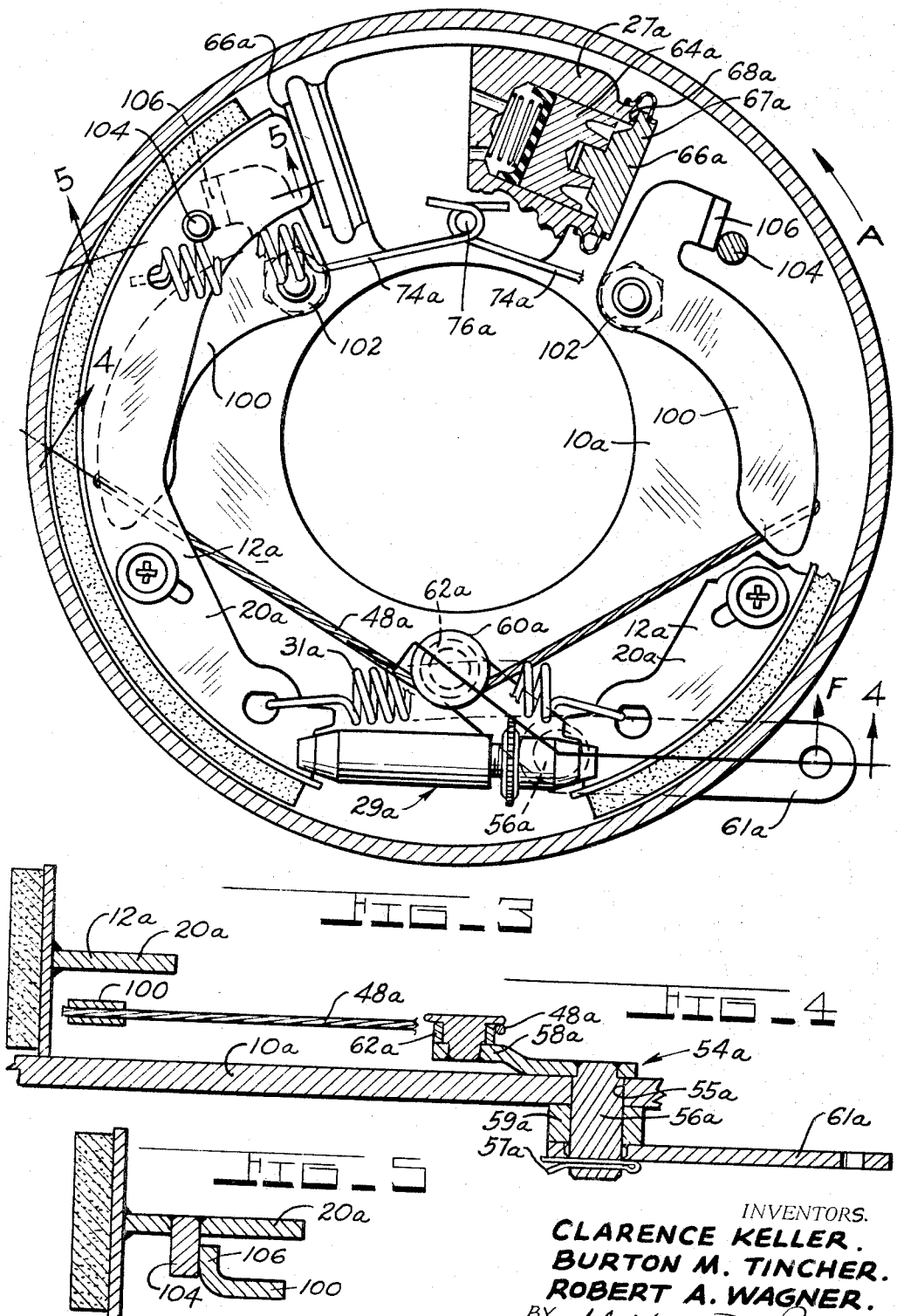

United States Patent Office 3,322,237
Patented May 30, 1967

3,322,237
PARKING BRAKE MECHANISM
Clarence Keller, Burton M. Tincher, and Robert A. Wagner, South Bend, Ind., assignors to The Bendix Corporation, a corporation of Delaware
Filed Sept. 10, 1965, Ser. No. 486,355
9 Claims. (Cl. 188—78)

This invention relates to a construction for mechanically actuating a drum brake.

An object of this invention is to provide a drum brake assembly with a mechanically actuated mechanism which is efficient and compact to fit within the space limits of the brake assembly.

Other objects of the invention will become apparent from the following description with reference to the drawings wherein:

FIGURE 1 is a front elevational view of a brake assembly;

FIGURE 2 is a view taken along section line 2—2 of FIGURE 1;

FIGURE 3 is a front elevational view of a brake assembly illustrating a modified version of FIGURE 1;

FIGURE 4 is a view taken along section line 4—4 of FIGURE 3; and

FIGURE 5 is a view taken along section line 5—5 of FIGURE 3.

Referring to FIGURE 1, a backing plate 10 is adapted to be attached to a fixed part of a vehicle, as for instance, an axle flange. A pair of brake shoes 12 are slidably mounted on the backing plate 10 in end-to-end relationship for engagement with a rotatable drum 14. The brake shoes 12 each comprise a rim 16 with lining 18 attached thereto and a transverse web 20 attached at its outer edge to the rim 16. A V-shaped wheel cylinder housing 27 is secured in any well known manner to the backing plate 10 and is located between one pair of adjacent shoe ends 28. A well known three-piece adjusting strut 29 is located between the other pair of adjacent shoe ends 30 and a shoe-to-shoe spring 31 holds the shoe ends 30 in engagement with the strut. A pin 38 extends through aligned openings in a lever 40 and in the web 20 and the nut 42 is secured to the pin 38 to thereby pivotally mount the lever 40 on the web 20. The right hand brake shoe 12 has been broken away to show the lever 40 in full. A cable retainer 44 is pivotally mounted to the free end of the lever 40 by a flat headed pin 46 held in place by a cotter pin 47. Each end of the cable 48 extends through an opening in a flange 49 of the cable retainer 44, and buttons 50 are swedged to each end of the cable 48 and engage the surface around the opening on flange 49 to secure the cable to each cable retainer.

A bellcrank lever 54 is provided and comprises a shaft 56 extending through an opening 55 in the backing plate 10 and through an annular spacer member 59, a cable actuating lever end 58 welded to the front end of the shaft 56 and an input lever end 61 splined to the rear end of the shaft 56. A cotter pin 57 extends through the rear end of the shaft 56 to maintain the bellcrank lever in assembled relationship with respect to the backing plate and spacer 59. The spacer 59 provides lateral support for the shaft 56. A flat headed pin 60 is welded to the cable actuating end 58 and an annular sleeve 62 rotates on the pin 60 and engages the cable 48 intermediate the ends thereof.

A pair of actuating pistons 64 (one shown) are slidably mounted in the cylinder housing 27. A cap 66 is secured to the piston 64 and has an annular flange 67 which engages the annular end surface 68 on the cylinder housing 27 for anchoring thereagainst. The lever 40 has a camming surface 70 which engages the end face 72 of the cap 66. Return springs 74 are connected at one end to the shoe 12 and its other end to a stationary pin 76 for returning the shoes to their released position which is in engagement with the face 72 of the caps 66 while the caps are in anchoring engagement with the end surface 68 on the cylinder housing 27.

In operation, assuming drum rotation in the direction of arrow A, the fluid actuating pistons 64 will thrust the shoes 12 outwardly in engagement with the drum 14. The drum rotation will tend to rotate the brake shoes as a unit in a counterclockwise with the thrust exerted on shoe 12 transmitted through the strut 29 to the right hand shoe 12 whereby the right hand shoe 12 will anchor at its end on the cap 66 and thereby on the cylinder housing. Upon release of braking pressure, the shoe return spring 74 will return the shoes to their released position and maintain the caps 66 in anchoring engagement with the cylinder housing 27.

The mechanical brake application operates as follows: A mechanical force F is applied to the lever input end 61 to turn the bellcrank lever in a counterclockwise direction. The cable actuating end 58 will stress the cable 48 to draw the two ends thereof together thereby turning the right hand lever 40 in a clockwise direction and the left hand lever 40 in a counterclockwise direction about the pins 38. The camming surface 70 on each lever will react on the cap 66 to provide a thrust through the pin 38 to the shoes 12 to spread the same into engagement with the drum 14. Upon reelase of the brake applying force F on the lever input end 61, the shoe return springs 74 will return the shoes to their normally released position and at the same time effect rotation of the levers 40 and bellcrank lever 54 to their normally released position.

Referring to FIGURE 3, a modification of the brake assembly of FIGURE 1 is illustrated therein. Those elements which are the same as in FIGURE 1 are indicated with the same reference numerals with a small $a$ affixed thereto. The brake is modified by pivotally mounting the mechanically actuated levers on the backing plate rather than on the brake shoes. Each lever 100 is pivotally secured to the backing plate 10a by a nut and bolt assembly 102. A pin 104 extends through an opening in the web 20a in a direction away from the web toward the backing plate and is welded to the web. A flange 106 extends from the shoe applying end of the lever 100 in a direction away from the backing plate 10a toward the web 20a and engages the pin 104 to provide a thrust connection between the lever 100 and the brake shoes 12a. The cable 48a is secured at each end to the free end of the lever 100 and is engaged intermediate the ends thereof by the cable actuating end 58a of the bellcrank lever 54a.

The operation of the brake is the same during fluid actuation thereof. Upon applying force F to the bellcrank lever 54a, the bellcrank lever will turn in a counterclockwise direction stressing the cable 48a thereby rotating the right hand lever 100 in a clockwise direction and rotating the left hand lever 100 in a counterclockwise direction whereby the flange 106 imparts a force on the pin 104 to thereby spread the shoes into engagement with the drum 14a. The shoe return springs 74a will return the shoes 12a, the levers 100 and bellcrank lever 54a to their normally released position upon release of the actuating force F.

It is our intention to include within the scope of the following claims all equivalent applications of the invention whereby the same or substantially the same results may be obtained.

We claim:
1. In a brake assembly:
 a support member;
 a pair of brake shoes slidably arranged in end-to-end relationship on said support member;

a fluid actuating cylinder carried by said support member and located between one pair of adjacent ends of said brake shoes;

a pair of fluid actuated members slidably carried by said actuating cylinder each engaging a respective one of said brake shoe ends;

a pair of levers each pivotally mounted on said support member, said levers including thrust means operatively connecting each of said levers to a respective one of said adjacent ends of respective brake shoes, said thrust means comprising a camming surface operatively engaging a cooperative surface affixed to each of said brake shoes so that upon counterclockwise rotation of one lever and upon clockwise rotation of the other lever said levers will actuate their respective brake shoes;

a means interconnecting the other pair of adjacent ends of said brake shoes;

a cable connected at each end to a respective end of a respective one of said levers and abridging said support member between said levers; and a bellcrank lever pivotally connected to said support member having one end operatively connected to said cable intermediate the ends thereof for movement therealong for stressing said cable to draw the end portions thereof in a direction toward one another to thereby rotate each one of said pair of levers in opposite directions.

2. In a brake assembly:

a support member;

a pair of brake shoes slidably arranged in end-to-end relationship on said support member;

a fluid cylinder housing carried on said support member and located between one pair of adjacent ends of said shoes;

a pair of fluid actuated members slidably carried by said fluid cylinder housing and engaging a respective one of said ends of said brake shoes, said fluid actuating members each including stop means providing anchoring engagement of said fluid actuating members with said fluid cylinder housing to limit the inward movement of said fluid actuating members with respect to said cylinder housing;

a pair of levers each pivotally connected to a respective one of said brake shoes for pivotal movement about an axis generally perpendicular to said support member, said levers each having cam surfaces on one end thereof engaging a respective one of said fluid actuating members providing fulcruming support thereon for said levers during rotation thereof so that upon counterclockwise rotation of one lever and clockwise rotation of the other levers said levers will act on respective ends of said brake shoes to slidably actuate same; and means operatively connected to the other end of each of said levers opposite that having the camming surface for rotating said levers to thereby actuate said brake shoes, said means comprising, a cable connected at each end to each of said levers at the end opposite that having the camming surface thereon, said cable abridging said support member, and an actuator operatively connected to a portion of said cable intermediate the ends thereof for stressing said cable to draw the ends thereof in a direction toward one another to thereby rotate the levers in opposite directions, said actuator including a bellcrank lever pivotally connected to said support member having one end operatively connected to said cable intermediate the ends of said cable for movement therealong.

3. A brake assembly comprising in combination:

a support member;

a pair of brake shoes slidably arranged in end-to-end relationship on said support member;

a pair of levers operatively arranged within the brake assembly, one of said levers operatively engaging one of said brake shoes and another of said levers operatively engaging another of said brake shoes; and a means operatively connecting said levers to cause said levers to rotate in opposite directions and equally actuate said pair of brake shoes, said means including, a cable connected at one end to said one lever and at the other end to said another lever to extend across said support member, a bellcrank operatively connected to said support member having an input lever end and an actuating lever end, and a means affixed to said actuating lever end to operatively connect said bellcrank to said cable intermediate the length of said cable abridging said support member between said levers and movable therealong upon actuation of said input lever end to rotate said levers in opposite directions and expand said brake shoes.

4. The structure as recited in claim 3 wherein said means affixed to said actuating lever end is characterized as an annular sleeve rotatably affixed to said actuating lever end over which said cable is placed such that said sleeve will permit said actuating lever end to move along said cable.

5. The structure as recited in claim 4 wherein said cable and said actuating lever end lie in the plane parallel to said support member.

6. A brake assembly according to claim 5 and further characterized as having said levers in the same plane as said cable and actuating lever ends whereby a downward force on said cable provides a downward and outward force on each of said brake shoes.

7. In a vehicle brake having a brake drum, a fixed backing plate, a pair of brake shoes operatively connected to said backing plate and a wheel cylinder means supported by said backing plate between ends of said pair of brake shoes which face each other, a mechanical means to actuate said brake shoes, said mechanical means comprising:

a first lever pivotally arranged in the vehicle brake having an end thereof operatively connected to one end of said brake shoe;

a second lever pivotally arranged in the vehicle brake having an end thereof operatively connected to one end of another brake shoe;

a cable means abridging said backing plate in an arcuate direction beneath said levers, said cable having one end thereof connected to said first lever and another end thereof connected to said second lever; and a bellcrank operatively connected to said backing plate, said bellcrank having an input lever end and an actuating lever end with means on said actuating lever end for receiving said cable that permits said actuating lever end to move along said cable to equally pull said first lever in one direction and said second lever in another direction by decreasing the span of said cable across said backing plate thereby equally actuating said brake shoes.

8. The structure according to claim 5 wherein the means of said actuating lever end is characterized as an annular sleeve rotatably secured to said actuating lever end by a pin.

9. A brake assembly comprising:

a support member;

a brake means operatively connected to said support member, said brake means including a pair of brake linings;

a first lever operatively arranged on said support member for applying one of said pair of brake linings;

a second lever operatively arranged on said support member for applying another of said pair of brake linings;

a cable whose ends are affixed to said first and second levers such that said cable extends across said support member in a plane of said levers, which plane is parallel to said support member; and a bellcrank operatively connected to said support member having an actuating lever end in the plane of said levers, and an input lever end, said actuating lever end having a point of connection with said cable which shifts along said cable.

References Cited

UNITED STATES PATENTS

| | | | |
|---|---|---|---|
| 1,967,414 | 7/1934 | La Brie | 188—78 |
| 2,060,917 | 11/1936 | White | 188—78 X |
| 2,081,588 | 5/1937 | La Brie | 188—78 |
| 2,127,739 | 8/1938 | La Brie | 188—106 |
| 2,146,010 | 2/1939 | Chase | 188—106 X |
| 3,023,853 | 3/1962 | Nawrot | 188—106 X |

MILTON BUCHLER, *Primary Examiner.*

B. S. MOWRY, T. W. BUCKMAN,
*Assistant Examiners.*